United States Patent
Sawhney et al.

(10) Patent No.: US 11,132,845 B2
(45) Date of Patent: Sep. 28, 2021

(54) REAL-WORLD OBJECT RECOGNITION FOR COMPUTING DEVICE

(71) Applicant: Microsoft Technology Licensing, LLC, Redmond, WA (US)

(72) Inventors: Harpreet Singh Sawhney, Kirkland, WA (US); Andrey Konin, Redmond, WA (US); Bilha-Catherine W. Githinji, Bellevue, WA (US); Amol Ashok Ambardekar, Redmond, WA (US); William Douglas Guyman, Medina, WA (US); Muhammad Zeeshan Zia, Redmond, WA (US); Ning Xu, Sammamish, WA (US); Sheng Kai Tang, Redmond, WA (US); Pedro Urbina Escos, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/420,080

(22) Filed: May 22, 2019

(65) Prior Publication Data

US 2020/0372715 A1 Nov. 26, 2020

(51) Int. Cl.
*G06T 19/00* (2011.01)
*G06T 7/73* (2017.01)
(Continued)

(52) U.S. Cl.
CPC .............. *G06T 19/006* (2013.01); *G06T 7/75* (2017.01); *G06T 15/04* (2013.01); *G06T 15/506* (2013.01);
(Continued)

(58) Field of Classification Search
CPC ................... G06T 19/006; G06T 15/04; G06T 2207/20081; G06T 7/75; G06T 15/506;
(Continued)

(56) References Cited

U.S. PATENT DOCUMENTS 8,774,504 B1 * 7/2014 Sundareswara ...... G06K 9/4652
382/165
9,041,722 B2 5/2015 Gloudemans et al.
(Continued)

FOREIGN PATENT DOCUMENTS

WO 2015102014 A1 7/2015

OTHER PUBLICATIONS

"HDRSource HDR Libraries", Retrieved From https://web.archive.org/web/20190202034107/https://www.hdrsource.com/ Feb. 2, 2019, 2 Pages.
(Continued)

*Primary Examiner* — Terrell M Robinson
(74) *Attorney, Agent, or Firm* — Alleman Hall Creasman & Tuttle LLP

(57) ABSTRACT

A method for object recognition includes, at a computing device, receiving an image of a real-world object. An identity of the real-world object is recognized using an object recognition model trained on a plurality of computer-generated training images. A digital augmentation model corresponding to the real-world object is retrieved, the digital augmentation model including a set of augmentation-specific instructions. A pose of the digital augmentation model is aligned with a pose of the real-world object. An augmentation is provided, the augmentation associated with the real-world object and specified by the augmentation-specific instructions.

19 Claims, 6 Drawing Sheets

(51) Int. Cl.
*G06T 15/04* (2011.01)
*G06T 15/50* (2011.01)

(52) U.S. Cl.
CPC ...... *G06T 2200/04* (2013.01); *G06T 2200/24* (2013.01); *G06T 2207/20081* (2013.01); *G06T 2219/004* (2013.01)

(58) Field of Classification Search
CPC ............. G06T 2200/04; G06T 2200/24; G06T 2219/004
See application file for complete search history.

(56) References Cited

U.S. PATENT DOCUMENTS

| | | | |
|---|---|---|---|
| 9,113,050 | B2 | 8/2015 | Laughlin |
| 2004/0095385 | A1 | 5/2004 | Koo et al. |
| 2006/0233423 | A1* | 10/2006 | Najafi ................. G06T 7/75 382/103 |
| 2011/0002531 | A1* | 1/2011 | Heisele ................ G06K 9/62 382/154 |
| 2013/0345870 | A1* | 12/2013 | Buehler ............... G05B 19/42 700/257 |
| 2014/0132601 | A1 | 5/2014 | Raghoebardayal et al. |
| 2015/0154806 | A1 | 6/2015 | Ogale |
| 2015/0302665 | A1* | 10/2015 | Miller ................. A63F 13/56 345/419 |
| 2017/0337741 | A1 | 11/2017 | Fradet et al. |
| 2018/0130234 | A1* | 5/2018 | Barker ................ G06T 7/0006 |
| 2018/0242920 | A1 | 8/2018 | Hresko et al. |
| 2019/0035165 | A1* | 1/2019 | Gausebeck ............ G06T 7/521 |
| 2019/0156585 | A1* | 5/2019 | Mott .................. G06T 19/20 |
| 2020/0089954 | A1* | 3/2020 | Zia .................. G06K 9/00671 |
| 2020/0234498 | A1* | 7/2020 | Price ................ G06K 9/00671 |

OTHER PUBLICATIONS

"Non Provisional Application Filed U.S. Appl. No. 16/132,329", filed Sep. 14, 2018, 38 Pages.
"Provisional Application Filed U.S. Appl. No. 62/791,679", filed Jan. 11, 2019, 44 Pages.
Basha, Chris, "Designing 3D Models for AR apps (ARKit)", Retrieved from https://blog.novoda.com/designing-for-ar-with-arkit/, Jan. 14, 2019, 12 Pages.
Nesterenko, Ivan, "Realistic Reflections and Environment Textures in ARKit 2.0", Retrieved from https://medium.com/©ivannesterenko/realistic-reflections-and-environment-textures-in-arkit-2-0-d8d0f1332eed, Jun. 13, 2018, 4 Pages.
Wang, et al., "Unsupervised Texture Transfer from Images to Model Collections", In Journal of ACM Transactions on Graphics, vol. 35, Issue 6, Nov. 11, 2016, 13 Pages.
Wu, et al., "Real-Time Object Pose Estimation with Pose Interpreter Networks", In Journal of Computing Research Repository, Aug. 2018, 8 Pages.
Xiang, et al., "PoseCNN: A Convolutional Neural Network for 6D Object Pose Estimation in Cluttered Scenes", In Journal of Computing Research Repository, Nov. 2017, 10 Pages.
Gausemeier, et al., "Development of a Real Time Image Based Object Recognition Method for Mobile AR-Devices", In Proceedings of the 2nd International Conference on Computer Graphics, Virtual Reality, Visualisation and Interaction in Africa, Feb. 3, 2003, pp. 133-139.
"International Search Report and Written Opinion Issued in PCT Application No. PCT/US2020/026021", dated Jul. 7, 2020, 13 Pages.
Sarkar, et al., "Trained 3D Models for CNN Based Object Recognition", In Proceedings of the 12th International Joint Conference on Computer Vision, Imaging and Computer Graphics Theory and Applications, Feb. 27, 2017, 8 Pages.
Tremblay, et al., "Training Deep Networks with Synthetic Data: Bridging the Reality Gap by Domain Randomization", In Proceedings of Computer Vision and Pattern Recognition Workshops, Jun. 18, 2018, pp. 1082-1090.

* cited by examiner

REAL-WORLD OBJECT RECOGNITION FOR COMPUTING DEVICE

BACKGROUND

Various computer vision techniques may enable a computing device to detect and identify real-world objects in a local environment. Many such techniques involve manual annotation of large numbers of images depicting real-world objects that are visually similar to those the computing device is intended to detect. This can be used to train and develop object recognition models relying via various machine learning (ML) and/or artificial intelligence (AI) techniques.

DETAILED DESCRIPTION

Figure 1:
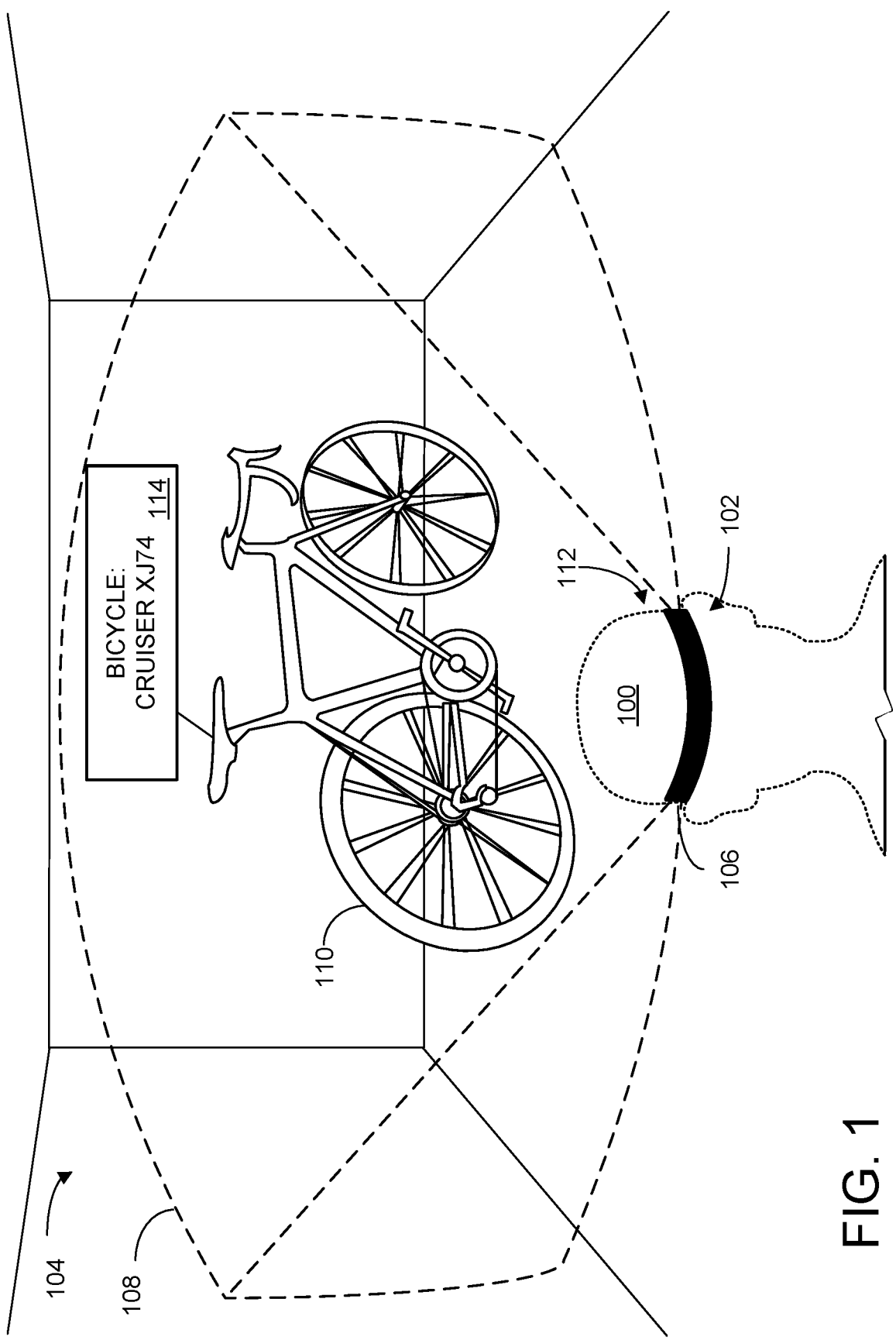
FIG. 1 schematically illustrates recognition of a real-world object by a computing device.

As discussed above, typical approaches to computerized object recognition involve manual annotation of large numbers of training images. For instance, for a computing device to recognize a specific type of bicycle, one or more human annotators may examine a plurality of images of the bicycle (or visually similar bicycles) under different conditions, and indicate which parts of each image (e.g., via a two-dimensional bounding box) correspond to the bicycle. Using suitable machine learning (ML), artificial intelligence (AI), or similar techniques, such annotated images may be used to train an object recognition model, which may then recognize new, unannotated images of the bicycle, with variable levels of accuracy.

However, training an object recognition model in this manner can be time-consuming and error-prone. For instance, manual annotation of images as discussed above can take a significant amount of time and/or human resources to build a suitably large set of annotated images. Furthermore, the resultant object recognition model will only be as good as the set of training images that was annotated. As such, inadvertent biases in the annotated image set, human error on the part of the annotators, and/or various other factors may contribute to a less accurate and less efficient object recognition model. For instance, a set of training images may be annotated that inadvertently only includes images of bicycles in outdoor environments. This can result in an object recognition model that struggles to recognize bicycles in indoor scenes, for instance due to lighting conditions that only occur indoors. Furthermore, such training requires that a large body of suitable images of bicycles (or other real-world objects) already exists, which may not always be the case.

Accordingly, the present disclosure is directed to techniques for recognizing real-world objects by a computing device. Such recognition may be done on the basis of an object recognition model trained on a plurality of computer-generated training images that depict a digital training model corresponding to a real-world object. Use of such computer-generated training images, as opposed to the manual annotation of images described above, may result in faster and more efficient training of an object recognition model.

Furthermore, the present disclosure describes various augmentations that may be provided by a computing device after recognizing a real-world object. For instance, as will be discussed in more detail below, a computing device may retrieve and align a digital augmentation model with a real-world object. The computing device may then provide one or more augmentations specified by augmentation-specific instructions included with the digital augmentation model. Provided augmentations may include, as examples, display of visual content that labels components of the real-world object, instruction/maintenance/assembly instructions for the real-world object, virtual controls usable to remotely control the real-world object, etc.

Additionally, or alternatively, suitable non-visual augmentations may be provided. As one example, an augmentation may indicate various grasps and grasp points on the digital augmentation model that can be associated with specific parts of the real-world object. Such grasps and grasp points may be interpreted by an autonomous robot (such as an assembly machine, sorting machine, etc.) for physically grasping or manipulating the real-world object. In this manner, via provided augmentations, autonomous machines may assemble, disassemble, examine, move, or otherwise manipulate real-world objects.

Recognition of a real-world object by a computing device is schematically illustrated in FIG. 1, which shows an example user 100 using a computing device 102 in an environment 104. In this example, the computing device is an augmented reality device including a near-eye display 106. Via the near-eye display, user 100 has a FOV 108 in which virtual images displayed by computing device 102 are visible to user 100. Near-eye display 106 may take any suitable form, including a transparent or partially-transparent display through which the user can directly view real-world environment 104. Alternatively, display 106 may take the form of a fully-opaque display configured to provide a live view of real-world environment 104 captured by a camera of the computing device. Regardless, user 100 has a view of real-world environment 104, and virtual images rendered by computing device 102 may be superimposed over that view, such that the virtual images appear to the user as if they are actually present in the environment.

It will be understood that computing device 102 is not limiting. In the illustrated example, the computing device takes the form of an augmented reality device configured to provide virtual imagery via a near-eye display, although other computing devices may provide virtual imagery in other suitable ways (e.g., via other types of displays). Furthermore, the object recognition and augmentation techniques described herein may be performed by any suitable computing system having any suitable form factor and collection of hardware resources, including devices not configured to present virtual imagery, or even visual content in general. As examples, suitable computing devices may include desktop computers, laptops, servers, augmented/virtual reality devices, mobile devices (e.g., smartphones, tablets), fitness devices, media centers, autonomous devices (e.g., drones, robots), etc. As another example, the techniques described herein may be implemented on computing system 600 described below with respect to FIG. 6.

Continuing with FIG. 1, computing device 102 has recognized a real-world object in environment 104 in the form of a bicycle 110. This may be done, for instance, on the basis of an image of environment 104 captured by a camera 112 of computing device 102. It will be understood that the camera need not be an integral part of the computing device. Rather, in some examples, the computing device may interface with one or more remote cameras in the local environment, and/or the computing device may obtain an image of the real-world object in another suitable way.

Upon recognizing the real-world object, computing device 102 provides an augmentation 114 relating to the real-world object. In this example, the augmentation takes the form of visual content presented to user 100, specifically as a label that denotes a recognized identity of the real-world object. However, as will be discussed in more detail below, the augmentation provided by the computing device may take any suitable form, and need not include visual content.

Further details regarding the object recognition and augmentation illustrated above with respect to FIG. 1 will now be given with respect to FIG. 2, which illustrates an example method 200 for object recognition. Method 200 may be implemented on any suitable computing device or combination of devices, including computing system 600 described below with respect to FIG. 6. Such a computing device may in turn provide any number of additional functions—e.g., including controlling one or more robot arms/hands to physically manipulate the real-world object after grasps/grasp points have been transferred from the digital augmentation model to the real-world object. Furthermore, the computing device that implements method 200 need not be physically near the real-world object. For instance, method 200 may be implemented on a server that is physically remote from the real-world object, yet receives data (e.g., an image) from a device that is physically near the real-world object. The server may then perform any or all of the steps discussed below with respect to FIG. 2.

At 202, method 200 includes receiving an image of a real-world object. The image of the real-world object may be received from any suitable source, including via a camera. In the example of FIG. 1, computing device 102 captures an image of bicycle 110 using camera 112. However, as discussed above, the computing device need not include an on-board or otherwise integrated camera. Rather, the image of the real-world object may be captured by any camera operatively-coupled with the computing device, including external cameras disposed within the surrounding environment, cameras integrated into other computing devices, etc. Thus, the image of the real-world object may be received from an external camera or other suitable device, via a suitable wired or wireless connection. The image of the real-world object may be captured by any suitable number of cameras, including a single camera, a stereoscopic pair of cameras, an array including a plurality of cameras, etc. Furthermore, the camera(s) may take any suitable form and may utilize any suitable technology. For instance, the camera may take the form of a conventional visible-light camera, IR camera, depth camera (e.g., time-of-flight, structured light), etc.

Furthermore, while the present disclosure primarily uses the bicycle shown in FIG. 1 as an example of a real-world object recognized by a computing device, it will be understood that this is not limiting. Rather, in various examples, a computing device may be configured to apply the object recognition and augmentation techniques described herein to virtually any real-world object. This can include vehicles, furniture, structures, living things, other computing devices, and/or any number of other animate or inanimate objects. Such objects may include static objects, intermittently mobile objects, or continuously mobile objects.

Figure 2:
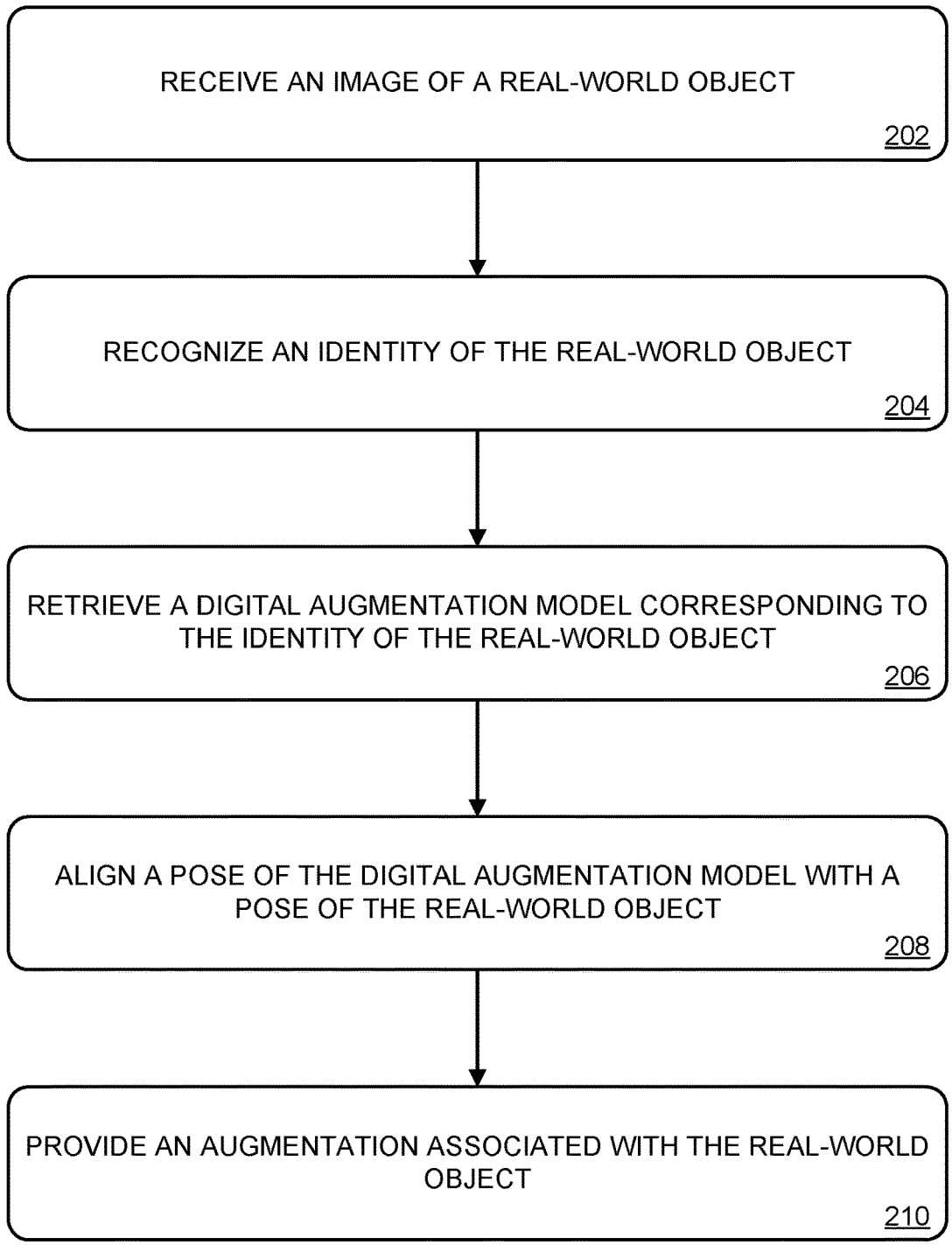
FIG. 2 illustrates an example method for object recognition.

Continuing with FIG. 2, at 204, method 200 includes recognizing an identity of the real-world object using an object recognition model. As discussed above, in some cases the object recognition model may be trained on a plurality of computer-generated training images, as opposed to relying on humans to manually annotate an existing body of training images. This will be described in more detail below with respect to FIG. 3. It will be understood, however, that the real-world object may be recognized in any suitable way, including via object recognition models trained partially or entirely on manually-annotated training images. In other words, a computing device may be configured to provide an augmentation in response to recognizing a real-world object, as will be described in more detail below with respect to FIG. 5, regardless of how the real-world object was recognized.

Figure 3:
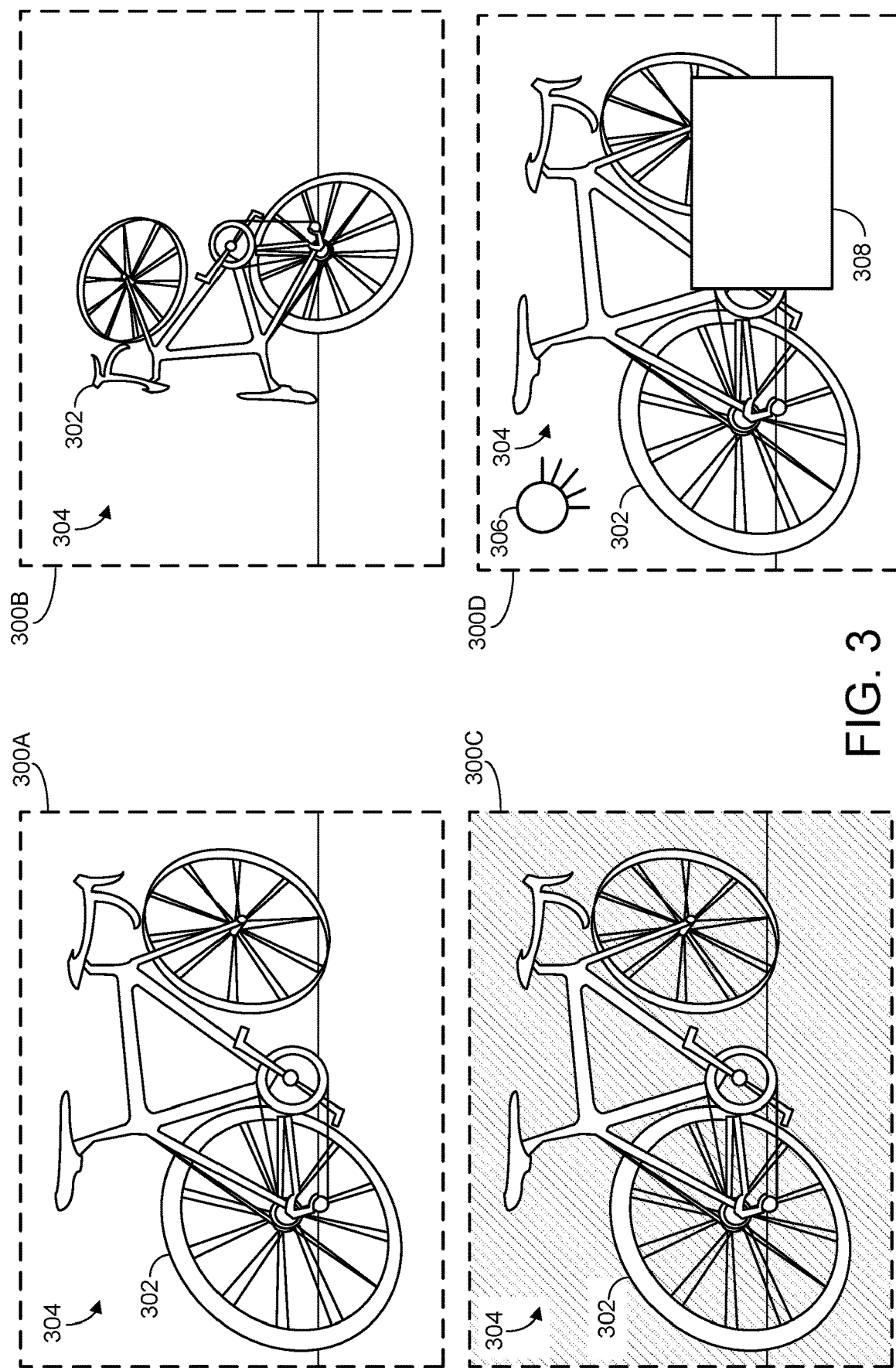
FIG. 3 illustrates a plurality of example computer-generated training images including a digital training model and a surrounding scene.

FIG. 3 shows an example plurality of computer-generated training images 300A-300D. As discussed above, such training images may be used to train an object recognition model to recognize one or more specific types of real-world objects depicted in the training images. This may be done using any suitable machine learning or artificial intelligence techniques, including those described below with respect to FIG. 6. Notably, this may in some cases be done in a similar manner as would take place in a conventional approach using manually-annotated training images. In other words, the present description is not intended to limit the herein-described object recognition techniques to any particular model training framework, but rather to describe examples of faster and more efficient ways to generate training images. Such training images may then be used to build an object recognition model based on any suitable framework including, as examples, R-CNN, SSD, YOLO, RetinaNet, etc.

In FIG. 3, each computer-generated training image includes a digital training model 302 that correspond to a real-world object, which in this case is a bicycle. Notably, however, these depictions need not correspond to photographs of one or more actual bicycles that exist in the real-world. Rather, while the digital training model will typically visually resemble whichever type of real-world object the computing device is intended to detect, the digital training model need not be based on any one specific real-world object (e.g., derived from an image of a specific real-world bicycle). For instance, the digital training model may take the form of a three-dimensional (3D) virtual object created via suitable 3D modeling software. In general, the digital training model may take the form of any set of computer data that, when rendered as part of a computer-generated training image, shares at least some visual similarities with a corresponding real-world object. In this manner, the digital training model can serve as a stand-in for the real-world object, such that the object recognition model can be trained to recognize the real-world object based on images including the digital training model.

In addition to the digital training model, each of the plurality of computer-generated training images includes a surrounding scene 304. The surrounding scene may take any suitable form and include any suitable content. In a simplified example, the surrounding scene may be entirely blank, meaning the digital training model is superimposed over a white (or other color) background. Alternatively, however, the surrounding scene may take the form of a simulated two-dimensional or three-dimensional space, for instance including a floor, background, light sources, other objects, etc.

To provide the object recognition model with a suitably diverse set of training images, one or more visual characteristics of one or both of the digital training model and surrounding scene may be varied between each of the plurality of computer-generated training images. In other words, from one training image to another, some aspects of either or both of the digital training model and surrounding scene may be changed.

This is illustrated by the plurality of computer-generated training images 300A-300D shown in FIG. 3. Specifically, in training image 300A, the digital training model 302 is shown along with a substantially empty surrounding scene 304. By contrast, in training image 300B, a pose (e.g., a six degree-of-freedom pose) of the digital training model has changed, as the digital training model now has a vertical orientation. Furthermore, the digital training model has decreased in size. In other words, varying the visual characteristics between one or more computer-generated training images may include one or both of changing a pose and changing a size of the digital training model.

By contrast, in training image 300C, the digital training model has the same pose and size as is shown in training image 300A, although aspects of the surrounding scene have changed. Specifically, the surrounding scene includes a background, and a visual appearance of this background has changed—i.e., to adopt a patterned texture. In other words, varying the visual characteristics of the plurality of computer-generated training images may include changing a visual appearance of the background. This visual appearance may be changed in any suitable way. As examples, a color or texture of the background may change, one or more virtual objects may be added to the surrounding scene (e.g., behind the digital training model), an apparent depth of the surrounding scene may be changed (e.g., so the background appears further away from the camera pose), one or more images may be added to the background (or other elements of the surrounding scene), etc. In a specific example, the digital training model may be superimposed over various images—e.g., of outdoor scenes, indoor scenes, virtual scenes, etc. Such images may be retrieved from any suitable source, including over the Internet.

In some examples, an appearance of the surrounding scene may be changed to be visually similar to conditions in which the object recognition model will be used to recognize real-world objects. For instance, if the computing device will likely be used to recognize objects in a particular environment (e.g., factory), then images of the actual environment may be used to construct the surrounding scene included in at least some of the plurality of computer-generated training images.

As additional examples, changing visual characteristics for one or more training images of a plurality may include occluding portions of the digital training model, and changing simulated lighting conditions in the surrounding scene. Both of these changes are represented in training image 300D. Once again, the digital training model has the same size and pose as is shown in image 300A. However, in image 300D, a new simulated light source 306 has been added. In some examples, effects of the new simulated light source may be rendered using high-dynamic range (HDR) lighting, or another suitable technology. In particular, lighting of the digital object model may be done using high-dynamic range imagery (HDRI) that captures a dome or cylinder/panorama of texture and lighting in realistic backgrounds. By adding the simulated light source, a visual appearance of the digital training model may be affected, which can provide additional data to the object recognition model. Similarly, in image 300D, part of the digital training model is obscured by an occlusion 308, which can also expose the object recognition model to new circumstances, resulting in more effective training. Notably, the digital training model may be obscured in any suitable way, including by blanking out portions of the model as is shown in image 300D, blurring/pixelating portions of the model, superimposing virtual objects or images over the model, etc.

It will be understood that the specific computer-generated training images shown in FIG. 3 are not limiting. In general, any suitable visual characteristics of the computer-generated training images may be varied from image to image, not only the specific visual characteristics discussed above. Furthermore, any of these visual characteristics, including those discussed above, may be varied to any suitable extent. For example, the pose of the digital training model may be changed in any suitable way, relative to any of the X, Y, and Z dimensions.

Returning briefly to FIG. 2, at 206, method 200 includes retrieving a digital augmentation model corresponding to the identity of the real-world object. In other words, the object recognition model (which may or may not be trained as discussed above) may recognize a real-world object in a captured image and output an identity of the real-world object. This identity may take any suitable form and use any suitable degree of granularity. For instance, in the case of a bicycle, the identity may simply be reported as "bicycle." Alternatively, the identity may specify "road bicycle," a specific brand of the bicycle, a model name/number of the bicycle, etc. Furthermore, these identities need not be reported in a human-readable language as is shown above, but rather may be output as a computer-readable reference number, identifier, or other suitable format.

Based on the reported identity of the real-world object, the computing device retrieves a digital augmentation model that corresponds to the identity. A "digital augmentation model" refers to a set of computer data that encodes a 3D virtual object having a similar visual appearance to the real-world object. Despite the present disclosure referring to the "appearance" of the digital augmentation model, the digital augmentation model will not necessarily be rendered for display, or otherwise presented in a human-viewable form. For instance, a digital image file may encode visual information, which may be analyzed, processed, or otherwise manipulated by a computing device, even if the encoded information is never actually displayed to a human. In a similar manner, the "appearance" of the digital augmentation model refers to visual characteristics encoded by computer data, even if such visual characteristics are never actually rendered for display.

Typically, the appearances of the real-world object and digital augmentation model will be similar enough that the digital augmentation model can be aligned with, or superimposed over, the real-world object. Thus, it is generally beneficial for the identity of the real-world object to be reported with as much detail as possible, so that a relatively similar digital augmentation model may be retrieved. To reuse the bicycle example, if the object recognition model reports the exact brand and model name/number of the bicycle, then the digital augmentation model retrieved by the computing device may be specific to the detected brand and model name/number of the real-world bicycle.

The specific format of the digital augmentation model may vary from implementation to implementation. In general, the digital augmentation model will include detail regarding the overall three-dimensional shape/dimensions of its corresponding real-world object. For instance, the digital augmentation model may be expressed as a point cloud, mesh, set of polygons, etc. In some examples, the digital augmentation model may specify additional details of the visual appearance of the real-world object, such as colors, logos, material types, safety/warning labels, etc. Notably, the digital augmentation model need not be rendered for display, or otherwise made visible, at any point.

The digital augmentation model also includes a set of augmentation-specific instructions that specify one or more augmentations to be provided by the computing device upon detecting the real-world object. Such augmentations will be described in more detail below with respect to FIGS. 5A-5C. Typically, the augmentation-specific instructions will take the form of one or more sets of computer-readable instructions, which may be expressed in any suitable computer-readable language or format. Furthermore, the augmentation-specific instructions may be "included" with the digital augmentation model in any suitable way—for instance, encoded within a computer file that also encodes the digital augmentation model, as metadata associated with such a computer file, as a separate file/data structure, etc.

The digital augmentation model, as well as the augmentation-specific instructions, may be retrieved from any suitable source. As examples, the digital augmentation model may be retrieved from a local database that includes a plurality of digital augmentation models corresponding to different real-world objects. Additionally, or alternatively, digital augmentation models may be retrieved from another computing device. This may be done directly (e.g., via a suitable device-to-device communication protocol, such as Bluetooth, Near-Field Communication, Wi-Fi, etc.), over a local wired/wireless network, over a wide-area network (e.g., the Internet), etc. In one example, the digital augmentation model may be retrieved from, or otherwise accessed through, a communications interface of the real-world object. For instance, when the real-world object is a computing device, and/or is equipped with suitable computing components, a digital augmentation model corresponding to the real-world object may be stored on the real-world object and transmitted to nearby computing devices upon request.

Furthermore, it will be understood that the digital augmentation model and the augmentation-specific instructions need not be retrieved from the same source. As discussed above, in some cases the augmentation-specific instructions may be specified in another computer file/data structure from the digital augmentation model. As such, each digital augmentation model and one or more sets of corresponding augmentation-specific instructions may be stored in separate databases on the same or different devices and associated with one another by reference, via a lookup table, and/or in another suitable way.

Figure 4:
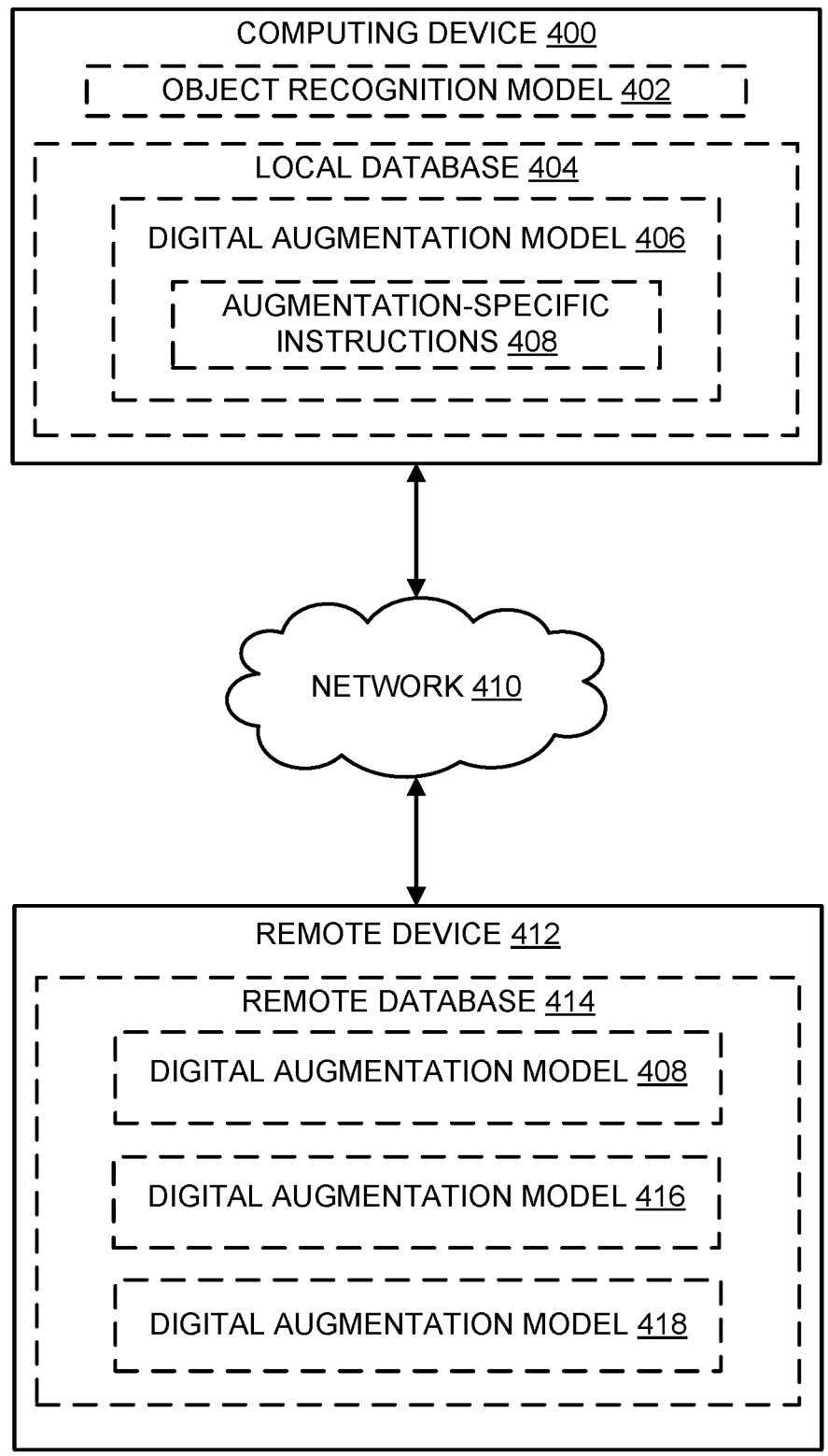
FIG. 4 schematically illustrates data exchange between a computing device and a remote device.

In another example, the digital augmentation model may be retrieved from a local database on the computing device, which may in turn include one or more digital augmentation models selected from a larger database stored on a remote device. This scenario is schematically illustrated in FIG. 4, which shows an example computing device 400. Device 400 includes an object recognition model 402, which may be trained to recognize one or more specific types of real-world objects as discussed above. Furthermore, the computing device includes a local database 404 including a digital augmentation model 406, which in turn includes a set of augmentation-specific instructions 408. It will be understood that, while only a single digital augmentation model is shown in the local database, this is not limiting, and any suitable number of augmentation models may be included. Furthermore, an individual digital augmentation model may include any suitable number of different sets of augmentation-specific instructions that may, for instance, correspond to different augmentations.

FIG. 4 also schematically shows an example remote device 412 exchanging data with computing device 400 over a network 410. Remote device 412 includes a remote database 414, which also includes digital augmentation model 408, as well as two different digital augmentation models 416 and 418. In other words, the specific digital augmentation models included in the local database 404 of computing device 400 may be selected from remote database 414, which may include a larger number of digital augmentation models—e.g., corresponding to a larger number of different real-world objects.

The specific selection of digital augmentation models included in the local database may be determined in any suitable way. In one example, the plurality of digital augmentation models included in the local database and selected from the larger, remote database may vary depending on a current location of the computing device. For instance, if the computing device is primarily used in a particular real-world environment (e.g., a particular room of a factory), then the digital augmentation models included in the local database may correspond to real-world objects found in the particular real-world environment. Thus, as the computing device moves between different environments, it may be configured to automatically update the local database by retrieving different digital augmentation models from the remote database.

In other examples, however, the specific selection of digital augmentation models included in the local database may be determined in other suitable ways. In general, the computing device may maintain one or more discrete sets of digital augmentation models that are loaded into the local database under any number of different conditions, including the device's current location, a current time-of-day, day-of-week, calendar day, current logged-in user, current operating mode/running software application, current state of a surrounding environment (e.g., which assembly lines in a factory are currently active), etc.

Returning briefly to FIG. 2, at 208, method 200 includes aligning a pose of the digital augmentation model with a pose of the real-world object. Again, notably, the digital augmentation model need not be rendered for display, or otherwise visually represented in any way. Rather, by aligning the digital augmentation model with the real-world object, the computing device establishes an internal understanding of which portions of the real-world object correspond to similar portions of the digital augmentation model. Thus, if for instance the augmentation-specific instructions specify that the computing device should display visual content that labels individual components of the real-world object, the computing device is able to determine pixel coordinates at which such virtual labels should be displayed.

Alignment between the real-world object and digital augmentation model may be achieved in any suitable way. In some examples, this may be done on the basis of one or more detectable visual features of the real-world object (e.g., edges, corners, or other distinctive features). The computing device may, upon detecting such features, assign each feature a particular position relative to a spatial coordinate system. Such a coordinate system may be defined relative to the computing device, relative to a surrounding environment, or another suitable frame-of-reference. The digital augmentation model may then be aligned to the real-world object by identifying portions of the digital augmentation model corresponding to the detected visual features of the real-world object, and assigning the identified portions of the digital augmentation model to the same positions as the detected visual features.

Returning again to FIG. 2, at 210, method 200 includes providing an augmentation associated with the real-world object and specified by the augmentation-specific instructions. As discussed above, the augmentation provided by the computing device may take any variety of suitable forms as specified by the augmentation-specific instructions, and can correspond to virtually any operation or function the computing device is capable of performing. In the event that method 200 is performed on a server (or other suitable computing device) that is physically remote from the real-world object, providing an augmentation may include transmitting instructions or other data to a computing device that is near the real-world object (e.g., an augmented reality device, an autonomous machine), which may then perform some function specified by the augmentation-specific instructions.

In a specific example, the augmentation-specific instructions may specify visual content to be displayed when at least a portion of the real-world object is visible to a camera of the computing device. Thus, providing the augmentation may include displaying the specified visual content. Notably, this may correspond to any camera the computing device is configured to communicate with and need not include an on-board or otherwise integrated camera. Furthermore, the visual content may be displayed in any suitable way—e.g., via a transparent or opaque near-eye display, integrated display taking another suitable form, external display (e.g., computer monitor, television, projector), etc.

Figure 5A:
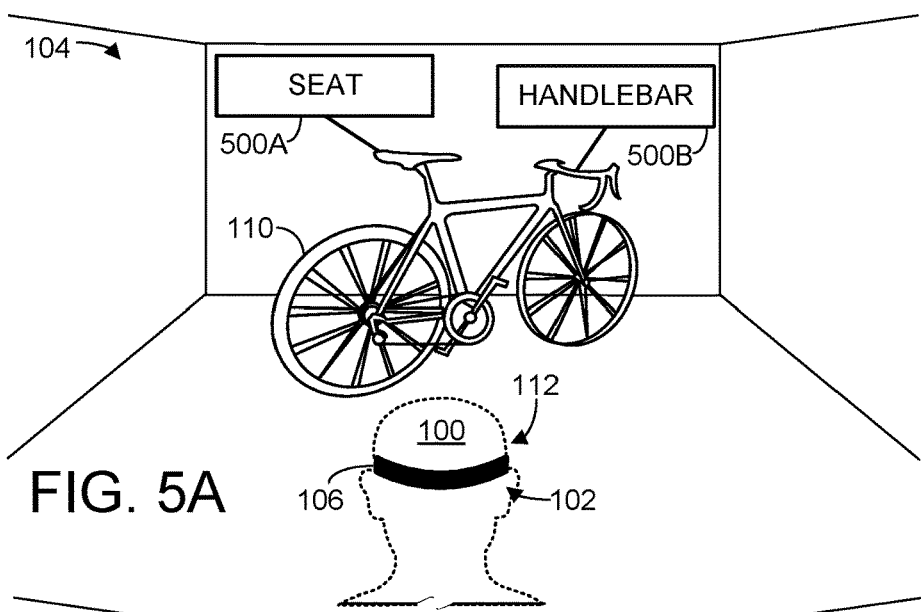
FIGS. 5A-5C schematically illustrate example augmentations provided by a computing device upon recognizing a real-world object.
Figure 5B:
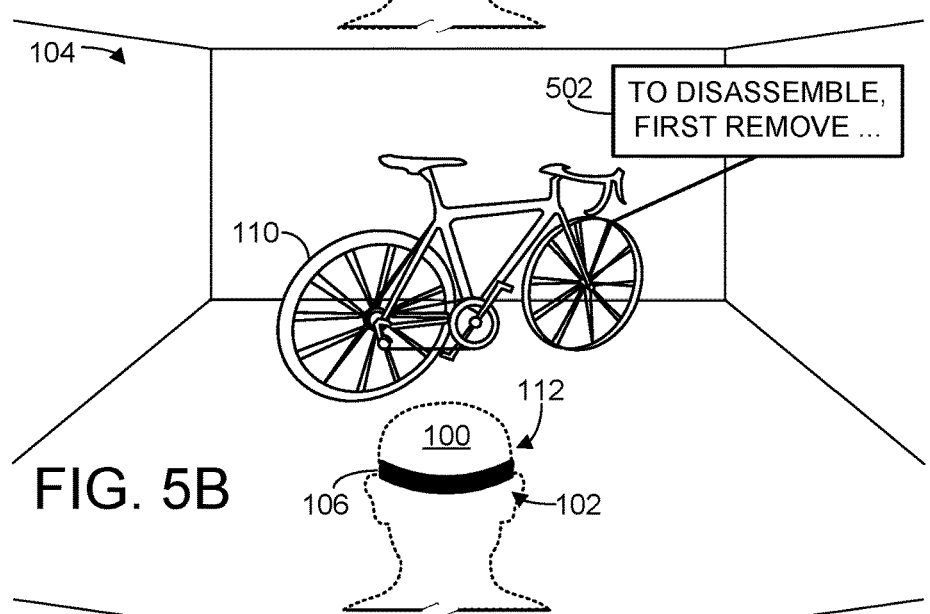
Figure 5C:
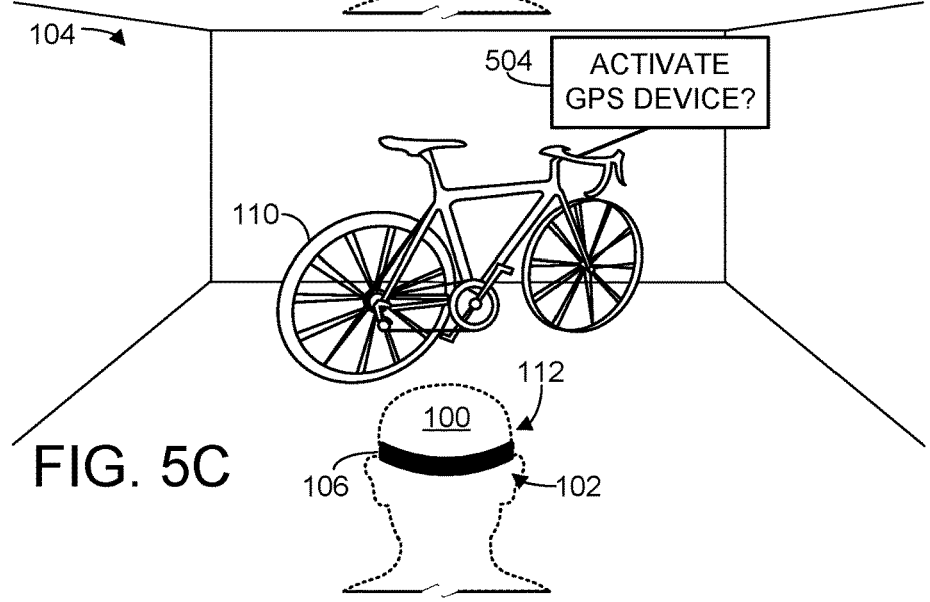

FIGS. 5A-5C show specific examples of various augmentations provided by a computing device that take the form of visual content. In FIG. 5A, the visual content provided by the computing device as part of the augmentation includes labels for one or more components of the real-world object. Thus, FIG. 5A again shows environment 104 of FIG. 1, although in this case various components of bicycle 110 have associated labels 500A and 500B rendered by the computing device. Notably, these labels are non-limiting examples, and any suitable components of real-world objects may be labeled with any level of detail.

By contrast, in FIG. 5B, the visual content provided by the computing device as part of the augmentation includes instructions 502 for disassembling bicycle 110. In other examples, other types of instructions may be provided, such as assembly instructions, maintenance instructions, operation instructions, and/or other useful information, such as diagrams/schematics, diagnostic data, a current running/operating state of a device, etc. For instance, a technician may make use of computing device 102 (or other suitable devices implementing techniques described herein) to assemble, diagnose, repair, operate, or otherwise interact with any variety of devices they encounter based on instructions provided by the computing device when such devices are recognized.

As another example, the visual content provided by the computing device may include one or more virtual controls manipulable by a human user to control the real-world device. In this example of FIG. 5C, bicycle 110 includes an on-board electronic GPS component. Thus, the visual content displayed by the computing device includes a virtual control 504 usable to activate the GPS. In other examples, any electronic components of a real-world object may be controlled in any suitable way via virtual controls provided by a computing device—e.g., to turn such electronic components on or off, activate particular functions, change settings, etc. In an example where the real-world object is a dishwasher, virtual controls may allow a user to start or stop the dishwasher, select a cleaning cycle, etc.

Notably, a computing device may be configured to provide any number of different augmentations that do not include display of visual content. In one example, the computing device may take the form of an autonomous robot, such as an automated assembly robot on a factory line. Thus, the augmentation-specific instructions may include computer-readable instructions for manipulating the real-world object. In other words, the augmentation provided by the computing device may include physically manipulating the real-world object—e.g., by moving it from one place to another, changing its orientation, adding/removing components, etc. As discussed above, this may in some examples be enabled when the augmentation specifies one or more grasps and grasp points relative to the digital augmentation model. Such grasps/grasp points may be transferred from the digital augmentation model to the real-world object from the point-of-view of an autonomous robot (or other suitable machine), which may then precisely assemble, move, or otherwise manipulate the real-world object based on the grasps and grasp points.

As additional examples, the augmentation may take the form of virtually any other functions or operations that a computing device is capable of performing. For instance, providing an augmentation may include transmitting data or instructions to another device, including another device in the local environment, a remote device (e.g., over the Internet), the real-world object itself, etc. The computing device may notify individuals—e.g., by making audible sounds (e.g., an announcement, an alarm), sending messages to devices belonging to one or more human users, etc. The computing device may start or stop one or more software applications, change one or more of its own settings, read/write specific computer data, power down/restart, and/or provide any other augmentation related to the real-world object.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
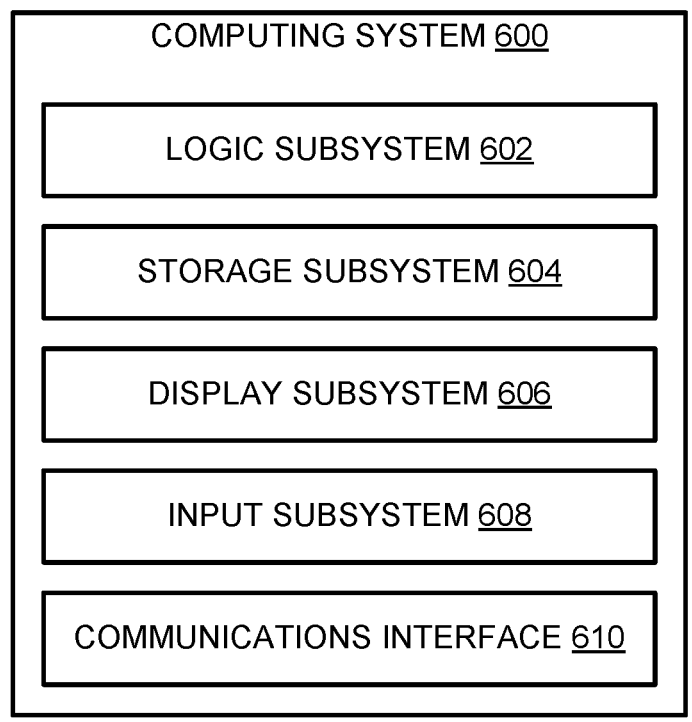
FIG. 6 schematically shows an example computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for object recognition comprises: at a computing device, receiving an image of a real-world object; recognizing an identity of the real-world object using an object recognition model, the object recognition model having been trained on a plurality of computer-generated training images; retrieving a digital augmentation model corresponding to the identity of the real-world object, the digital augmentation model including a set of augmentation-specific instructions; aligning a pose of the digital augmentation model with a pose of the real-world object; and providing an augmentation associated with the real-world object and specified by the augmentation-specific instructions. In this example or any other example, each of the plurality of computer-generated training images include a digital training model that corresponds to the real-world object. In this example or any other example, each of the plurality of computer-generated training images include the digital training model and a surrounding scene, and one or more visual characteristics of one or both of the digital training model and surrounding scene are varied between each of the plurality of computer-generated training images. In this example or any other example, varying the one or more visual characteristics includes changing a pose of the digital training model between one or more computer-generated training images of the plurality. In this example or any other example, varying the one or more visual characteristics includes, for one or more computer-generated training images of the plurality, occluding portions of the digital training model. In this example or any other example, varying the one or more visual characteristics includes changing a size of the digital training model between one or more computer-generated training images of the plurality. In this example or any other example, the surrounding scene includes a background, and varying the one or more visual characteristics includes changing a visual appearance of the background between one or more computer-generated training images of the plurality. In this example or any other example, varying the one or more visual characteristics includes, for one or more computer-generated training images of the plurality, changing simulated lighting conditions in the surrounding scene. In this example or any other example, the augmentation-specific instructions specifies visual content to be displayed when at least a portion of the real-world object is visible to a camera of the computing device, and providing the augmentation includes displaying the visual content. In this example or any other example, the computing device is an augmented reality device. In this example or any other example, the visual content includes labels for one or more components of the real-world object. In this example or any other example, the visual content includes one or more of assembly instructions, maintenance instructions, and operation instructions for the real-world object. In this example or any other example, the visual content includes one or more virtual controls that are manipulable to control the real-world object. In this example or any other example, the computing device is an autonomous robot, and the augmentation-specific instructions include computer-readable instructions for manipulating the real-world object. In this example or any other example, the digital augmentation model is retrieved from a local database including a plurality of digital augmentation models corresponding to different real-world objects. In this example or any other example, the plurality of digital augmentation models included in the local database are selected from a larger database of digital augmentation models stored on a remote device. In this example or any other example, the plurality of digital augmentation models selected from the larger database and included in the local database varies depending on a current location of the computing device. In this example or any other example, the digital augmentation model is retrieved from a communications interface of the real-world object.

In an example, a computing device comprises: a logic machine configured to: receive an image of a real-world; recognize an identity of the real-world object using an object recognition model, the object recognition model having been trained on a plurality of computer-generated training images; retrieve a digital augmentation model corresponding to the identity of the real-world object, the digital augmentation model including a set of augmentation-specific instructions; align a pose of the digital augmentation model with a pose of the real-world object; and provide an augmentation associated with the real-world object and specified by the augmentation-specific instructions.

In an example, a method for object recognition comprises: at a computing device, receiving an image of a real-world object; recognizing an identity of the real-world object using an object recognition model, the object recognition model having been trained on a plurality of computer-generated training images each including a digital training model corresponding to the real-world object and a surrounding scene, where one or more visual characteristics of one or both of the digital training model and surrounding scene are varied between each of the plurality of computer-generated training images; retrieving a digital augmentation model corresponding to the identity of the real-world object, the digital augmentation model including a set of augmentation-specific instructions specifying visual content to be displayed when at least a portion of the real-world object is visible to a camera of the computing device; aligning a pose of the digital augmentation model with a pose of the real-world object; and displaying the visual content specified by the augmentation-specific instructions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for object recognition, comprising:
   at a computing device, receiving an image of a real-world object;
   recognizing an identity of the real-world object using an object recognition model, the object recognition model having been trained on a plurality of computer-generated training images, each of the plurality of computer-generated training images having been generated by rendering a digital training model in a surrounding scene as a two-dimensional image, rather than by using a physical camera to capture an image of a physical environment, and varying one or more visual characteristics of one or both of the digital training model and the surrounding scene between one or more of the plurality of computer-generated training images;
   retrieving a digital augmentation model corresponding to the identity of the real-world object, the digital augmentation model including a set of predefined augmentation-specific instructions specifying one or more predefined augmentations for the identity of the real-world object;
   aligning a pose of the digital augmentation model with a pose of the real-world object; and
   providing an augmentation of the one or more predefined augmentations associated with the identity of the real-world object and specified by the augmentation-specific instructions.

2. The method of claim 1, where the digital training model visually resembles the real-world object when rendered as part of a computer-generated training image.

3. The method of claim 1, where varying the one or more visual characteristics includes changing a pose of the digital training model between one or more computer-generated training images of the plurality.

4. The method of claim 1, where varying the one or more visual characteristics includes, for one or more computer-generated training images of the plurality, occluding portions of the digital training model.

5. The method of claim 1, where varying the one or more visual characteristics includes changing a size of the digital training model between one or more computer-generated training images of the plurality.

6. The method of claim 1, where the surrounding scene includes a background, and where varying the one or more visual characteristics includes changing a visual appearance of the background between one or more computer-generated training images of the plurality.

7. The method of claim 1, where varying the one or more visual characteristics includes, for one or more computer-generated training images of the plurality, changing simulated lighting conditions in the surrounding scene.

8. The method of claim 1, where the augmentation-specific instructions specifies visual content to be displayed when at least a portion of the real-world object is visible to a camera of the computing device, and providing the augmentation includes displaying the visual content.

9. The method of claim 8, where the computing device is an augmented reality device.

10. The method of claim 8, where the visual content includes labels for one or more components of the real-world object.

11. The method of claim 8, where the visual content includes one or more of assembly instructions, maintenance instructions, and operation instructions for the real-world object.

12. The method of claim 8, where the visual content includes one or more virtual controls that are manipulable to control the real-world object.

13. The method of claim 1, where the computing device is an autonomous robot, and the augmentation-specific instructions include computer-readable instructions for manipulating the real-world object.

14. The method of claim 1, where the digital augmentation model is retrieved from a local database including a plurality of digital augmentation models corresponding to different real-world objects.

15. The method of claim 14, where the plurality of digital augmentation models included in the local database are selected from a larger database of digital augmentation models stored on a remote device.

16. The method of claim 15, where the plurality of digital augmentation models selected from the larger database and included in the local database varies depending on a current location of the computing device.

17. The method of claim 1, where the digital augmentation model is retrieved from a communications interface of the real-world object.

18. A computing device, comprising:
   a logic machine configured to:
      receive an image of a real-world object;
      recognize an identity of the real-world object using an object recognition model, the object recognition model having been trained on a plurality of computer-generated training images, each of the plurality of computer-generated training images having been generated by rendering a digital training model in a surrounding scene as a two-dimensional image, rather than by using a physical camera to capture an image of a physical environment, and varying one or more visual characteristics of one or both of the digital training model and the surrounding scene between one or more of the plurality of computer-generated training images;
      retrieve a digital augmentation model corresponding to the identity of the real-world object, the digital augmentation model including a set of predefined augmentation-specific instructions specifying one or more predefined augmentations for the identity of the real-world object;
      align a pose of the digital augmentation model with a pose of the real-world object; and
      provide an augmentation of the one or more predefined augmentations associated with the identity of the real-world object and specified by the augmentation-specific instructions.

19. A method for object recognition, comprising:
   at a computing device, receiving an image of a real-world object;
   recognizing an identity of the real-world object using an object recognition model, the object recognition model having been trained on a plurality of computer-generated training images each generated by rendering a digital training model corresponding to the real-world object in a surrounding scene as a two-dimensional image, rather than by using a physical camera to capture an image of a physical environment, where one or more visual characteristics of one or both of the digital training model and surrounding scene are varied between each of the plurality of computer-generated training images;

retrieving a digital augmentation model corresponding to the identity of the real-world object, the digital augmentation model including a set of predefined augmentation-specific instructions specifying predefined visual content to be displayed when at least a portion of the real-world object is visible to a camera of the computing device;

aligning a pose of the digital augmentation model with a pose of the real-world object; and displaying the visual content specified by the augmentation-specific instructions.

* * * * *